March 20, 1951 G. RATTRAY 2,546,111
PANORAMIC SIGHT
Filed June 13, 1946 4 Sheets-Sheet 1

Inventor
George Rattray
By J. H. Church & W. E. Thibodeau
Attorneys

March 20, 1951     G. RATTRAY     2,546,111
PANORAMIC SIGHT Filed June 13, 1946     4 Sheets-Sheet 2

Inventor
George Rattray

By J. H. Church & H. E. Thibodeau
Attorneys

March 20, 1951 G. RATTRAY 2,546,111
PANORAMIC SIGHT

Filed June 13, 1946 4 Sheets-Sheet 4

Inventor
George Rattray
By J.H.Church & H.E.Thibodeau
Attorneys

Patented Mar. 20, 1951

2,546,111

UNITED STATES PATENT OFFICE 2,546,111

PANORAMIC SIGHT

George Rattray, Mineola, N. Y., assignor to Mergenthaler Linotype Company, a corporation of New York Application June 13, 1946, Serial No. 676,527

11 Claims. (Cl. 88—70)

1

This invention relates to a panoramic sight of general utility but intended more specifically for use in the laying of a gun mounted upon the turret of a tank or other armored vehicle.

It is an object of the invention to provide a panoramic sight that may be inserted into its mount from the interior of the turret.

Another object is to provide a sight of the type mentioned wherein adjustment of the line of sight in elevation is effected by rotation of the entrance prism from a position closely adjacent the ocular and by a simple positively-acting mechanism completely enclosed within the telescope tube.

Another object is to provide a panoramic sight operable to rotate its line of sight through 360° of azimuth and strongly constructed so that the portion projecting from the turret may sustain powerful blows as from tree limbs, enemy attacks, etc., without derangement and without injury to the personnel within the turret.

More specifically, the immediately foregoing object is attained by rugged pivot joints that provide support along the pivot axes, on each side of the instrument.

A further object is the provision of a panoramic sight having compact, completely enclosed adjusting and indicating mechanism adjacent the ocular at its lower end to rotate the line of sight thereof in azimuth and elevation.

Another object is the provision of a sight as in the preceding paragraph wherein the adjusting and elevating mechanism includes means to maintain erect the field of view in said ocular for all azimuthal positions of the line of sight.

A still further object is to provide a universal gimbal mount for a telescope of the type aforesaid that has closely interfitting surfaces for all angular positions of the telescope relatively to the turret, whereby the entrance of foreign substances from without the turret is prevented.

Another object is to provide a telescope and universal mount having three mutually normal pivot axes the intermediate one of which is maintained parallel to the gun bore axis, together with means to pivot said telescope about said axes to bring said telescope into the vertical despite inclination of the turret on which it is mounted.

2

Other objects and advantages will become apparent as the description proceeds.

In the drawings:

Figure 2a is a view corresponding to Figure 2 showing in cross section the upper portion of the sight, as indicated by the line 2a—2a, Figure 1a.

Figure 2:
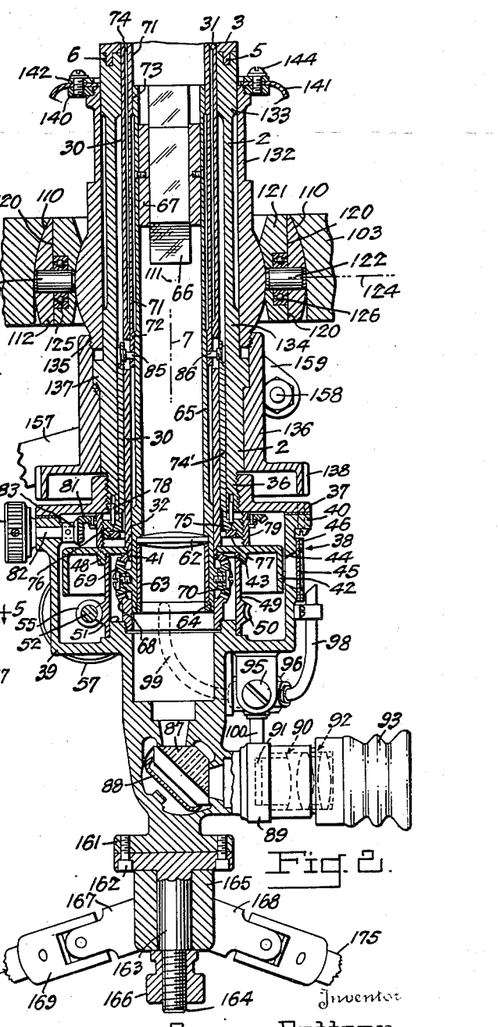
Figure 2 is a cross section through the central longitudinal axis of the lower portion of the instrument, as indicated by the line 2—2, Figure 1.
Figure 2A:
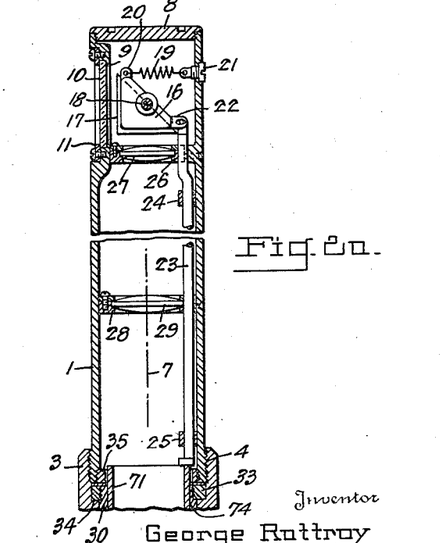

Referring in detail to the drawings, 1 identifies an upper tube section of the telescope and 2, a lower tube section. The two sections are connected in alignment and for relative rotation about their common central axis by a joint that, as shown in Figures 2 and 2a, comprises a coupling 3 having a counterbored threaded connection 4 with section 1 and having a circular flange 5, Figure 2, fitting a channel 6 in the end of section 2. Both flange and channel are concentric of the common axis 7 of the sections 1 and 2 which is also the optical axis of the instrument.

The upper end of section 1 is closed by a flanged cap 8 threadedly engaging the section. The wall of section 1 adjacent cap 8 is flanged as at 9 to receive a transparent pane 10 held in place by a bezel 11. The upper end of 1 also has a pair of aligned openings 12 and 13 defining an axis diametrical of the tube section and parallel to pane 10. Bearing pins 14 and 15 are threaded into these openings and have reduced ends having a smooth fit in holes in a frame 16. A 45° entrance prism 17 is fixed in frame 16 for pivotal movement about the axis 18 lying in the reflecting surface of 17. Frame 16 is urged into clockwise rotation, as seen in Figure 2a, by a spring 19 engaged at the other end with an apertured screw 21 threaded into the tube wall. A second lug 22 on frame 16 has pivoted connection with a push rod 23 adjacent one wall of section 1 and that terminates in a flattened end at the joint between the two sections. Rod 23 is guided for axial translation by a smooth fit in apertures formed in lugs 24 and 25 integral with section 1. The rod also passes through an aperture formed in a retaining flange 26 for a lens 27 and an aperture formed in a retaining flange 28 for a second lens 29. By this construction, prism 17 is rocked about its axis 18 to deflect the line of sight vertically as rod 23 is translated by means subsequently described.

From Figure 2 it will be noted that a sleeve 30 is positioned within section 2 and has a smooth fit therewith at its top, as indicated at 31. This sleeve is threaded at its upper end to receive a threaded collar 33 seated against a shoulder 34 formed by the counterbore of coupling 3, to thereby hold the two tube sections together. A collar 35 is threaded into the lower end of tube section 1 and acts as an abutment to limit the downward movement of rod 23 when the sections are disconnected. By the foregoing construction rotational movement about axis 7 is conveyed from sleeve 30 to section 1 while section 2 is motionless. Coupling 3, of course, rotates with section 1 and, at this time, flange 5 rotates within channel 6.

Figures 4, 5, 6, 9:
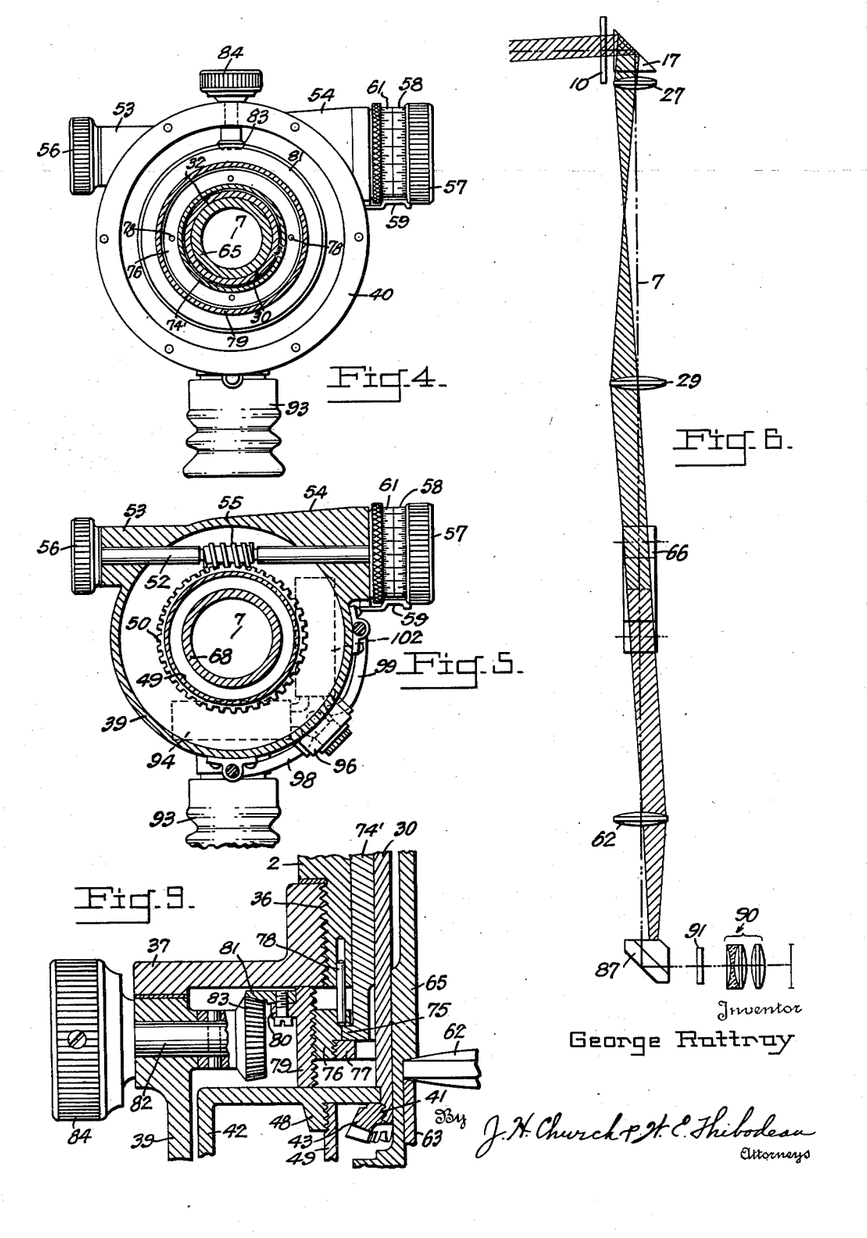
Figure 4 is a cross section taken upon a plane indicated by the line 4—4, Figure 1.
Figure 5 is a section taken upon a plane indicated by the line 5—5, Figure 1 and showing in detail the mechanism for effecting azimuth adjustment of the line of sight.
Figure 6 is a diagrammatic view showing the arrangement of the optical parts of the instrument and the parth of a light ray therethrough.
Figure 9 is a view to an enlarged scale of a portion of Figure 2 to show clearly the mechanism for effecting tilting of the entrance prism.

The lower end of section 2 is reduced and threaded, as indicated at 36, Figure 2, to receive the flange coupling 37 forming the upper portion of an indicator housing or casing, indicated generally by the numeral 38. The lower section 39 of housing 38 is generally cylindrical with a reduced lower end and has its upper end formed with a flange 40 mating with the flange of coupling 37. As seen at Figure 4, the two flanges have six equally spaced holes through which connecting bolts or screws may be passed. The two flanges may thus be secured together in various rotational relations to accommodate different installations.

Figure 1:
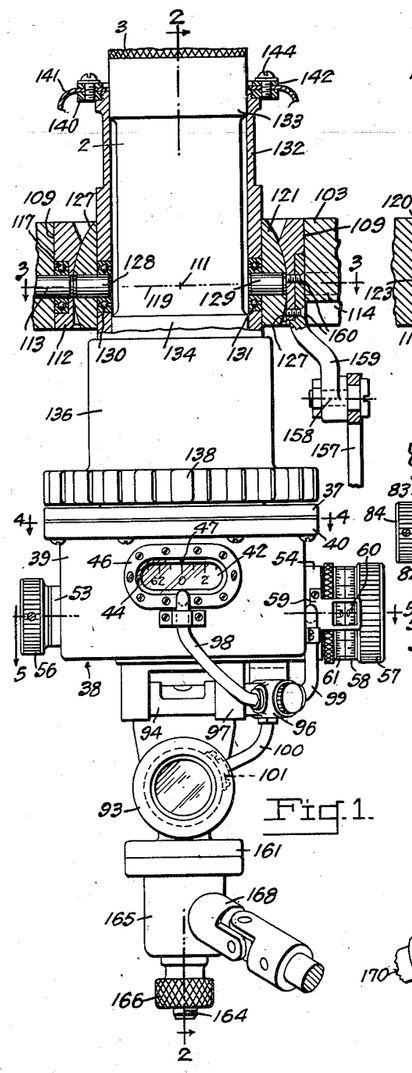
Figure 1 is an elevational view of the lower end of the sight showing the azimuth adjustment, the leveling connections and the mount, the latter being shown in section on a plane substantially as indicated by the line 1—1, Figure 3.
Figure 1A:
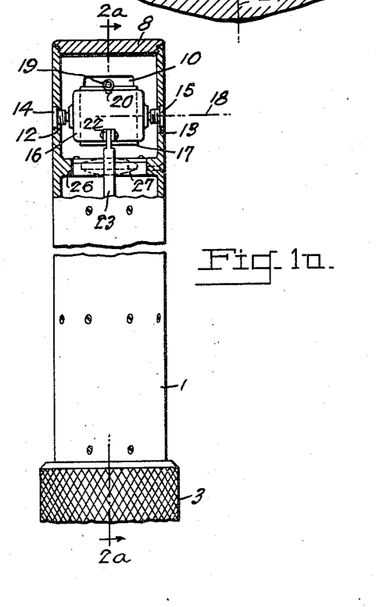
Figure 1a is an elevation corresponding to Figure 1, showing the top portion of the tube positioned exteriorly of the tank, the upper portion being sectioned to show the mount and operating connections for the entrance prism.

The lower end of sleeve 30 is reduced and threaded as indicated at 41. A cup-shaped indicator 42 fits on the aforesaid end of sleeve 30, and is held in position by a bevel sun gear 43 threaded on said sleeve and forming one side of a differential whose construction and function will be subsequently described. As shown at Figure 1, the periphery of dial 42 is graduated in 64 equal units of 100 mils each, and moves opposite a window 44 covered by a glass 45 held in place by bezel 46. An index 47 is formed upon the beveled edge of window 44 and against which the graduations on dial 42 are read. The indicator 42 is formed with an internally-threaded flange 48 within which one end of a tube portion 49 is threaded. This tube portion is formed integrally with, or has attached thereto, a worm gear 50 and, at its lower end rotatably fits a guiding flange 51 upstanding from the base of section 39. A shaft 52, Figures 2 and 5 is journaled in bearings provided by aligned bores in tangential projections 53 and 54 of housing section 39. This shaft has a worm 55 in mesh with gear 50 and projects at both ends from the housing. Operating knobs 56 and 57 are attached to the respective ends of shaft 52. Knob 57 has a scale 58 formed about a smooth portion of its periphery. This scale may be graduated in 100 units and geared to rotate 64 times for each complete 360° rotation of gear 50 and dial 42, whereby rotation of the line of sight may be read to the nearest mil. The scale 58 is read opposite an indicator 59 which, as seen in Figure 1, may comprise an apertured plate screwed to projection 54 and carrying a transparent plate having an indicator line 60 scribed on its side closely adjacent the scale. A gunners' scale 61 is provided in the form of a knurled band having a snug fit on a turned bearing portion of projection 54, concentric of shaft 52 and having a scale similar to or identical with scale 58. The two scales are contiguous and scale 61 is also readable against line 60. By the use of scale 61 an arbitrarily selected base line may be established as for firing at invisible targets, in the manner well known in the art.

By the foregoing construction, as shaft 52 is turned, corresponding rotation as a unit is effected for portion 49, dial 42, sleeve 30, coupling 3, tube section 1 and prism 17, to thereby rotate the line of sight in azimuth through precise and accurately measurable angles.

From lens 29, the field of view is projected to a lens 62 held in position by a sleeve 63 and retainer ring 64, within a counterbore in the lower end of a tube 65. Tube 65 has a smooth fit at its lower end within sleeve 30, as indicated at 32. A little above bearing portion 32, sleeve 65 is reduced in diameter to provide an annular space between itself and sleeve 30. A second sleeve 71 has its lower end fitting the aforesaid annular space to provide concentric bearing surfaces for all three sleeves 30, 71 and 65, as indicated at 72, Figure 2. Above bearing portion 72, sleeve 65 has its outer diameter reduced to provide a clearance between itself and sleeve 71 until at its top, it is again enlarged, to provide another bearing portion 73 between itself and sleeve 71. Sleeve 71 is internally enlarged between bearing portions 72 and 73, to afford additional clearance with sleeve 65. Sleeve 30 is also enlarged internally between portion 72 until it is again reduced at its top to provide a bearing surface 74 for sleeve 71.

Sleeve 65 has a carrier 67 fitting its upper end, within which a dove prism 66 is mounted. Rotation of sleeve 65 at one-half the speed of rotation of the line of sight, is effected by a differential, of which one sun gear 43 has been described. The other sun gear 68 is fixed to housing section 39 as by being threaded into flange 51, as clearly shown upon Figure 2. The lower end of tube 65 has planetary gears 69 and 70 pivoted upon its lower end, each in mesh with sun gears 43 and 68. In this manner, prism 66 is rotated at half the speed of rotation of sleeve 30, to thereby maintain erect the field of view, in the manner well known in the art.

The rod 23 and the manner in which its translation effects pivotal movement of prism 17 about axis 18, have been described. The foot of rod 23 rides on and abuts the square-cut end of sleeve 71 so that translation of sleeve 71 effects pivotal movement of prism 17.

A relatively short thin sleeve portion 74' is interposed between sleeve 30 and tube section 2, as more clearly shown at Figure 9. The lower end of sleeve 74' is outwardly flanged at 75. An internal shoulder of a threaded ring 76 is held in contact with flange 75, by a retainer ring 77 that may be threaded into ring 76. The sleeve 74' and its flange 75 are thus rotatable relatively to ring 76, while axial movement of the flange relatively to the ring is prevented. Ring 76 has a number of axially-extending pins, such as 78 each pin being slidably accommodated within a corresponding bore formed in the end of section 2 whereby the ring is limited to translation along axis 7.

An internally threaded sleeve or collar 79 has an axial dimension for a smooth fit between the lower finished surface of coupling 37 and the upper surface of dial 42. The sleeve threadedly engages ring 76 and has an external flange 80 to which a bevel gear 81 is attached in a position concentric of axis 7. A shaft 82 is journaled within a bearing formed in the wall of housing 39, and carries a bevel pinion 83 in mesh with gear 81. A knob 84 on shaft 82 enables rotation of gear 81 and sleeve 79, to thereby vertically translate ring 76 and sleeve 74' with a slow precise motion. Sleeve 74' projects upwardly to the level of bearing portion 72, where it carries a pair of pins 85 and 86, at diametrically opposite points. These pins have reduced ends that project through axially elongated slots in sleeve 30 and fit within bearing holes in sleeve 71. By this construction, rotation of knob 84 acts to translate sleeve 71 and rod 23 and to pivot prism 17 to deflect the line of sight in elevation. Since rotation of sleeve 71 relatively to rod 23 does not affect the adjustment of prism 17 about axis 18, pins 85 and 86 are not required to have a snug fit through the elongated slots in sleeve 30. In other words, any play of sleeves 71 and 74' about axis 7 has no effect upon the adjustment of the line of sight, either in azimuth or elevation.

From lens 62, the field of view passes to Amici prism 87, carried by a frame 88 in a reduced lower extension of housing section 39. The exit portion 89 of this extension has an ocular 90 comprising a reticle 91 at the focal plane of the lens 62, a conventional eye-piece assembly 92 and rubber guard 93. A cross-leveling bubble tube level 94, Figure 1, is mounted between lugs depending from the bottom wall of housing section 39. One end of the level housing is closed by a threaded plug 95 while the other end communicates with a lamp housing 96 mounted in lug 97 coaxially of the level. A small incandescent bulb is mounted within housing 96 and lengths of "Lucite" or other light-conducting medium 98, 99 and 100 extend from openings in the housing to terminate adjacent window 44, indicator 59 and reticle 91, respectively, whereby to illuminate the various dial and indicator portions of the instrument. Rod 100 extends through a hole in extension 89 to a position adjacent the periphery of reticle 91 and is held in position by a flanged ring 101, secured to extension 89, as shown in Figure 1. A second fore and aft level 102 is indicated in Figure 5 with its axis at right angles to level 94. This level is carried in the same manner as level 94 and has one end in communication with housing 96. Thus one lamp serves to illuminate both levels as well as the azimuth scales and reticle.

Figure 3:
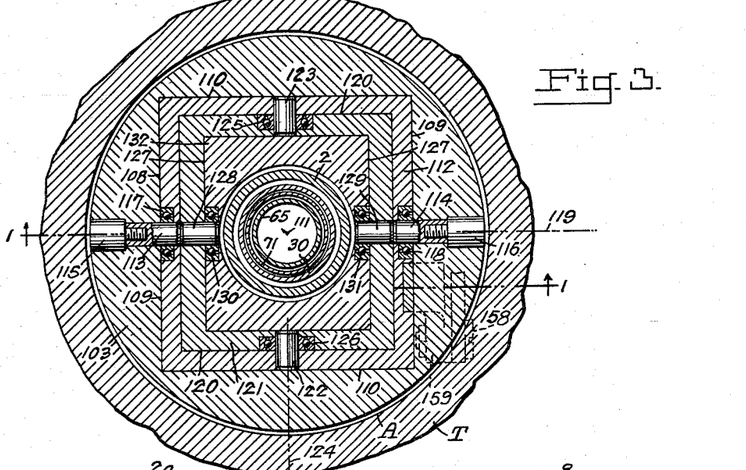
Figure 3 is a cross section taken upon a plane indicated by the line 3—3, Figure 1, and illustrating the telescope mount including the fore and aft and cross-leveling axes.
Figures 7, 8:
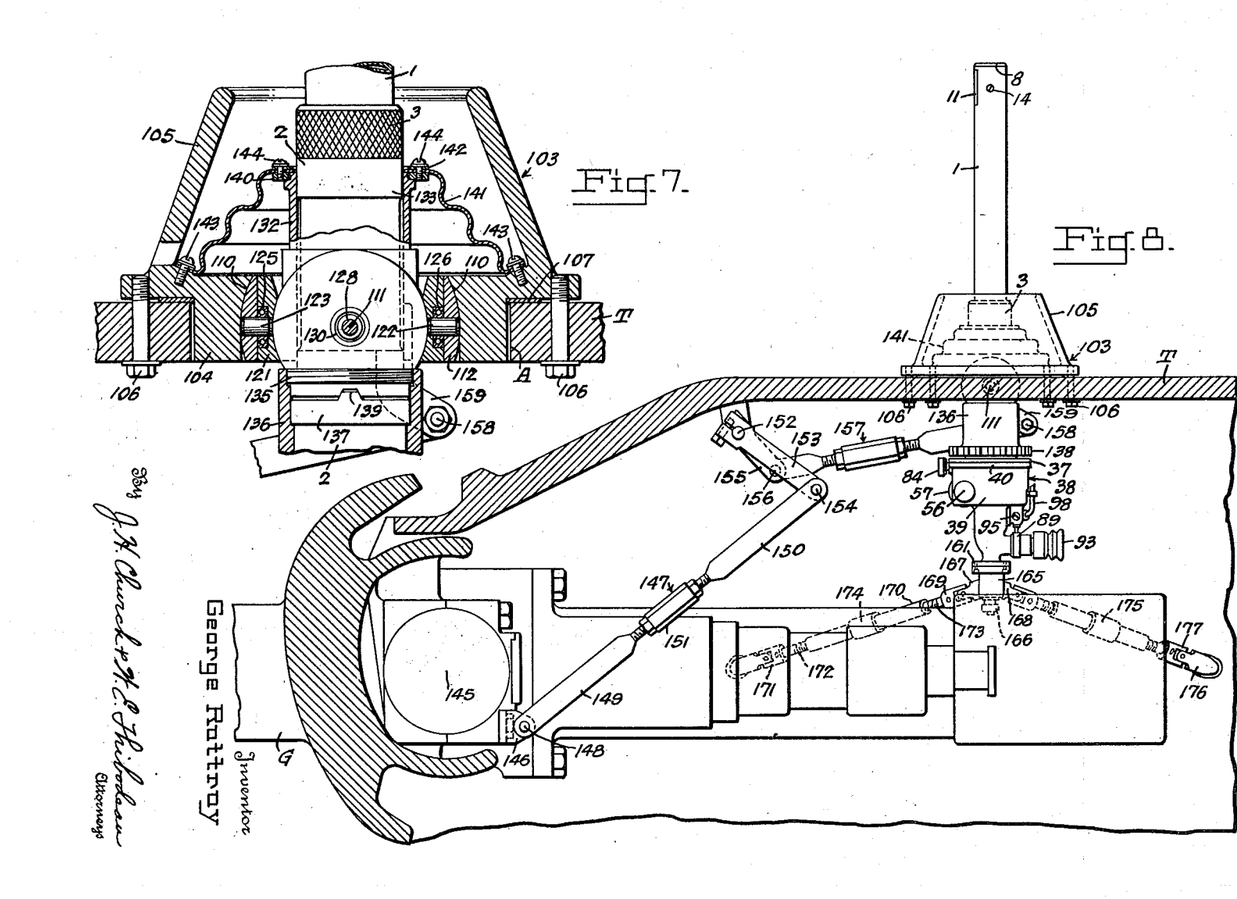
Figure 7 is a sectional view taken upon the same plane as Figure 2 and showing the projecting flange for the sight, the flexible skirt to exclude the entrance of moisture and dust, and the key-way for locating the sight in definite predetermined position within its mount.
Figure 8 is a sectional view through a tank turret having my sight applied thereto and taken in a vertical plane parallel to the gun bore.

The mounting for the sight is shown in detail in Figures 1 to 3, inclusive, 7 and 8, wherein T indicates the top of the tank turret having therein a circular opening A, Figure 7. A closure ring 103 has a projection 104 fitting opening A, as well as a flange provided with an upwardly-extending, frusto-conical projection 105 affording protection of the exterior portions of the telescope against injury by blows and enemy fire. Screws 106 secure ring 103 to the turret, a gasket 107 being provided between the two to afford a weather-tight joint.

Ring 103 has a square opening 108 having two opposite side edges square cut as indicated at 109, Figure 1, and the other two edges concave over their top halves as at 110, Figure 2 to form the surface of a cylinder concentric about an axis through point 111, normal to the plane of the figure. As seen at Figures 1 and 3, a pair of pivot pins 113 and 114 are mounted in aligned bores at diametrically opposite sides of ring 103, to define an axis that is parallel to the axis of elevation of the gun, as will be subsequently described. Each pin may be retained in position by respective plugs 115 and 116 having a reduced threaded end engaging an axial threaded hole in the pin. Each plug fits a counterbore of its aperture in ring 103 whereby, when the pin and plug are screwed together axial movement of the pin is prevented.

A gimbal ring 112 has square-cut and convex sides to fit opening 108, as clearly shown in Figures 1 and 2. This ring has aligned openings to receive the outer races of anti-friction bearings 117 and 118. The projecting ends of pins 113 and 114 fit the inner races of these bearings and thus act to pivot gimbal ring 112 for movement about an axis 119, Figure 3, passing through pivot point 111. Because of the mating cylindrical surfaces 110, the small clearance between rings 103 and 112 remains constant and affords substantially no space for the entrance of dirt and moisture.

The inner sides of ring 112 opposite each of the squarecut outer sides, are formed as concave cylindrical surfaces concentric of an axis through point 111, normal to the plane of Figure 1. The other two sides are flat, as indicated at 120. Gimbal ring 112 has pivot pins 122 and 123 fixed in opposite aligned holes therein to define an axis 124 at right angles to axis 119. These pins project into, and fit, the inner races of bearings 125 and 126 carried by a second gimbal ring 121. Ring 121 has two opposite sides flat to fit between the flat sides of ring 112. Its other two sides are formed externally as cylindrical surfaces about axis 124, as indicated at 127, Figure 1, to have a smooth fit within the inner cylindrical sides of ring 112 whereby it may freely pivot about axis 124 relatively to ring 112, without altering the relatively close fit between the two.

Ring 121 has aligned openings in which are fixed pivot pins 128 and 129 to define an axis through point 111 normal to axis 124. This axis is shown at Figure 3 as coincident with axis 119 although, of course, the two may be angularly related when ring 121 pivots relatively to ring 112, about axis 124. The projecting ends of pins 128 and 129 fit the inner races of anti-friction bearings 130 and 131 carried in openings formed in a telescope mounting sleeve 132. As seen in Figure 1, the contiguous interfitting faces of ring 121 and sleeve 132 lie in closely adjacent parallel planes normal to the axis of pins 128 and 129. Likewise, from Figure 2, it will be noted that sleeve 132 is enlarged to form convex portions of the surface of a cylinder about the axis of pins 128 and 129 which closely and smoothly fit between the concave inner cylindrical surfaces of ring 121 also concentric of the axis of pins 128 and 129. The three gimbal axes thus defined by the respective pairs of pins 113, 114, 122, 123 and 128, 129, are concurrent at point 111.

Sleeve 132 has an internal bore within which enlarged bearing portions 133 and 134 of tube section 2 closely fit. Since no portion of the coupling 3 and tube section 1 has a transverse dimension greater than the diameter of the aforesaid bearing portions, the telescope may be inserted into its mount from within the turret. The lower end of sleeve 132, has threads 135 on its lower end, adapted to be engaged by the internal threads formed in the upper counterbored end of a retainer 136. This counterbore forms a shoulder adapted to engage the external flange 137, Figures 2 and 7, of tube section 2. A knurled flanged enlargement 138 integral with retainer 136 is provided to facilitate rotation thereof. Retainer 136 has a smooth fit on the portion of section 2 below flange 137 and when turned home upon sleeve 132, acts to firmly hold the telescope within said sleeve. Referring to Figure 7, it will be noted that sleeve 132 and flange 137, have an interfitting projection and depression, as at 139 whereby the telescope may be located in a precise azimuthal position within its mount.

The top of sleeve 132 is flanged and threaded to receive a ring 140, a flexible boot 141 has its lower edge secured to ring 103, just inside projection 105 as by circumferentially-spaced screws 143. The upper edge of the boot is attached by clamping between ring 140 and a retainer ring 142 held to ring 140 by screws 144. This boot effectively keeps foreign substances from lodgement between the relatively moving parts of the mount.

The axis 124 defined by pivots 122 and 123, is the cross-leveling axis of the mount and, in accordance with usual procedure, is maintained parallel with the axis of the gun bore. This parallelism is automatically preserved in the present invention by a linkage connection between ring 112 and the gun. This linkage is shown upon Figure 8 which also shows the gun G having its breech portion within turret T and rotatable as a unit with the turret. The gun is carried on the turret by trunnions defining an elevation axis 145 normal to the plane of the paper in Figure 8. A bracket 146 is secured to the gun and is pivotally connected with an adjustable-length link 147 on an axis 148 parallel to axis 145 and spaced therefrom a predetermined distance. The link 147 comprises two aligned sections 149 and 150, connected by a turnbuckle 151 so that the effective length of the link may be varied.

A shaft 152 is journaled in a pair of brackets affixed to the top of the turret. A crank arm 153 is secured to shaft 152 and is pivoted at its end to the other end of link 147, as at 154. The connections are such that the distance 145—148 is equal and parallel to the distance 152—154. The shaft 152 extends to the right hand side of the gun, where it has secured thereto a second lever arm 155. The outer end of lever 155 is pivoted on an axis 156 to a second adjustable link 157 having its other end pivoted at 158 to a lever arm 159 which, as best shown upon Figure 1, is fixed by screws 160, to one side of ring 112. The link 157 is adjustable in effective length in the same manner as link 147 and the connections and dimensions are such that the distance 152—156 is equal and parallel to the distance 111—158.

The gun is shown upon Figure 8 as at zero quadrant elevation. The link connections just described, and the rotational position of ring 103 with relation to the turret, are such that the axis 124 determined by pivot pins 122 and 123 is parallel to the gun bore axis. At this time, with the indicator dial 42 at zero indication, the line of sight lies in a plane parallel to the vertical plane through the bore axis by reason of the interengaging projection and recess 139. Hence, ring 112 is rotated synchronously with the gun as the latter is elevated or depressed and axis 124 is at all times parallel to the bore axis.

By reason of pivot pins 122, 123 and 128, 129, the sight is mounted for universal pivotal movement about pivot center 111 and in normal operation, is brought to a true vertical position. This adjustment is effected by a connection between the lower end of housing section 39 and the turret. Referring to Figures 1, 2 and 8, it will be noted that the aforesaid section 39 terminates in a flange 161 and is connected by screws 162 with a mating flange integral with a stud 163 having a reduced threaded end 164. A collar 165 fits stud 163 and is adapted to be held thereon by a nut 166. Collar 165 has forked projections 167 and 168 extending therefrom each adapted to form one section of a pair of universal joint connections. The mating section of 167 is identified at 169 and is fixed to one end of a link 170 having its other end connected through a universal joint 171 whose final section is attached to the turret wall. The link 170 consists of two oppositely threaded aligned parts 172 and 173 connected in alignment by a turnbuckle member 174.

The mating section of projection 168 is carried at one end of a second adjustable link 175 identical in construction with 170, and connected to the turret wall at 176, through a universal joint 177. Preferably, but not necessarily, the lines of action of links 170 and 175 are substantially at right angles to each other.

Assuming that the link connections between the gun and telescope mount have been effected and adjusted as described in connection with Figure 8, the telescope is placed in position by sliding sections 1 and 2 upwardly from within the turret, through telescope mounting sleeve 132, until projections 139 interengage. At the same time retainer 136 is turned up on threads 135 of sleeve 132 to thereby firmly hold the telescope in position. When a visible target is selected for engagement by the tank commander, the indicator dial is adjusted to zero as shown in Figure 1. The gun is elevated to the angle corresponding to the predetermined range of the target. This movement acts through the linkage shown in Figure 8, to pivot ring 112 about the axis 119 determined by pivot pins 113 and 114. It will be remembered that this axis is parallel to the gun trunnion axis and because of the parallelogram linkages the axis 124 determined by pins 122 and 123, elevates synchronously with the gun and remains parallel to the bore axis. The turret is then rotated until the target is picked up in the line of sight and, apart from minor adjustments for windage, drift, etc., the gun is then properly aimed in case the tank position is truly horizontal.

In nearly all cases, however, the tank will have components of tilt both in the vertical plane through the trunnion axis, and in the vertical plane through the bore axis. The first component will introduce errors both in azimuth and elevation, the second in elevation only. When such tilt components are present, they will result in departure of one or both levels 94 and 102 from centralized position. The gunner then adjusts the turnbuckles of the links 170 and 175 until both levels are again centralized and the optical axis of the telescope is vertical. The component movements necessary to thus render the telescope vertical take place about mutually perpendicular axes, namely, the axis 124 elevated to the angle of gun elevation and parallel to the bore axis, and the axis determined by pivot pins 128 and 129.

The first component of tilt above mentioned, namely, trunnion tilt, causes the bore axis of the elevated gun to traverse a portion of the surface of a cone having its axis horizontal, and thus deflects the gun bore from correct position, both by a change in azimuth and a decrease in elevation. When the telescope is brought to the vertical by cross-leveling about axis 124, the line of sight traverses the surface of a cone about an axis parallel to the bore axis and is deflected in azimuth and depressed in elevation relatively to the bore axis by angular values that are equal to the aforesaid deflections of the gun from its correct position with respect to the target. In the case of azimuth, the deflection of the line of sight relatively to the gun is in the same direction as the deflection of the gun relatively to the target so that when turret, gun and sight are rotated as a unit to restore the line of sight to the target the azimuth error is fully corrected. The line of sight may be moved in elevation the slight amount necessary to place it upon the target, by adjustment of knob 84.

In firing upon an invisible target, the range and azimuth at the gun, relatively to a visible aiming point are determined. The gun is elevated to the quadrant angle for that range and the turret is rotated until, with the telescope vertical, the cross wires intersect the aiming point. The knob 57 is rotated to rotate the line of sight in the opposite direction to the invisible target until the dial 42 and scale 58 are moved from zero to indicate the predetermined azimuth of the target from the aiming point. The turret is then rotated until the line of sight is again upon the aiming point. Cross-leveling is effected as previously described, and a final azimuth adjustment of the turret is effected. When the sight is vertical and on the aiming point, firing is begun.

The sight may also be used to determine the azimuth angle at the tank between and two visible points. Since the initial and final readings are taken in each case with the optical axis of the telescope in vertical position, the scale reading or difference in readings, gives the true angle between the points measured in a horizontal plane.

I have thus provided a panoramic sight that is rugged, highly accurate, rapid in operation and versatile in operation, while I have shown the form now preferred, alterations, modifications and substitutions of equivalents will occur to those skilled in the art after a study of the present disclosure. Hence I do not wish to be limited to the precise details of construction shown and I desire to reserve all such changes as fairly fall within the scope of the sub-joined claims.

Having now fully disclosed the invention, what I claim and desire to secure by Letters Patent is:

1. In a panoramic telescope, upper and lower tube sections interconnected in end-to-end relation for relative rotation about their common axis only, an entrance prism carried by the upper end of said upper section for pivotal movement about a normally horizontal axis, and deflecting rays incident thereon 90° along the axis of said sections, a housing carried by the lower end of said lower section, first and second sleeves within said lower section coaxial therewith, an indicator dial in said housing and fixed to the lower end of said first sleeve concentric of said common axis, first manually operable means carried by said housing and connected to rotate said indicator and thereby said first sleeve, second manually operable means carried in said housing to axially translate said second sleeve and including an internally threaded third sleeve rotatably mounted coaxially of said tube sections by and between said housing and dial, a positive driving connection between said first sleeve and upper tube section, a push rod translatable on and along said upper section and engaging the square-cut upper end of said second sleeve, and means operated by said rod to rotate said prism in response to translation of said second sleeve and second manually operable means carried by said housing and operable to rotate said third sleeve and thereby pivot said entrance prism about its normally horizontal axis.

2. In a panoramic telescope, a normally-vertical tube, having an entrance reflector pivotal within its upper end for pivotal movement about mutually normal azimuth and elevation axes, a housing secured to the lower end of said tube and having an annular top wall, means to rotate said reflector about said azimuth axis including a first sleeve fixed with said reflector and rotatable within and coaxially of said tube, and a dial in said housing fixed to said first sleeve coaxial therewith, and means to rotate said reflector about said elevation axis, including a second sleeve limited to translation within and axially of said first sleeve, a threaded ring in said housing connected with said second sleeve said ring being limited to rotation coaxially of said sleeve, a third rotatable sleeve threadedly engaging said ring and fitting between said dial and the top wall of said housing, whereby rotation of said third sleeve axially moves said ring and second sleeve, means responsive to axial movement of said second sleeve to pivot said reflector about its elevation axis and means responsive to axial movement of said second sleeve to pivot said entrance reflector about its normally horizontal axis.

3. A periscopic telescope comprising a normally vertical telescope tube defining a first axis, an entrance prism, tubular means mounting said entrance prism on said tube for rotation about said first axis and tilting about a second axis normal to said first axis, said second axis lying in the reflecting surface of said prism, a housing secured to the lower end of said tube and having a top formed with a plane lower surface normal to said first axis, a rotatable indicator dial in said housing concentric of said first axis and having a plane upper surface spaced below and parallel to the plane lower surface of said top, a sleeve having a smooth fit between said plane surfaces, and concentric of said first axis, said tubular means connecting said dial and prism for rotation as a unit about said first axis, a connection between said sleeve and prism to tilt said prism about said second axis in response to rotation of said sleeve, first manually operable means carried by said housing to rotate said dial and prism and second manually operable means carried by said housing to rotate said sleeve and thereby tilt said prism.

4. In a periscopic sight for a gun mounted for elevation upon an unstable platform rotatable in train, upper and lower aligned tube sections, connected for relative rotation, optical means carried by said tubes and adapted to deflect a line of sight 90° downwardly through said section, thence 90° into an ocular carried by a housing upon the lower end of said lower section, a mounting plate fixed to said platform and having a generally rectangular opening therein, a first gimbal ring closely fitting said opening and pivoted therein upon a first axis parallel to the elevation axis of said gun, a second generally rectangular gimbal ring closely fitting said first ring and pivoted therein on a second axis normal to said first axis, a mounting sleeve closely fitting said second ring and pivoted therein on a third axis normal to said second axis, the interfitting surfaces of said plate, rings and sleeve being formed as portions of surfaces of revolution about their respective axes, means connecting said gun and first ring to maintain said second axis parallel to the gun bore axis, and interengaging means carried by said sleeve and lower tube section to maintain said sight in predetermined axial and rotational position within said sleeve.

5. The combination as specified in claim 4, an indicator dial rotatable in said housing concentric of said tube sections, and means including said dial operable to rotate said upper section relatively to said lower section about their common axis, to rotate in azimuth the line of sight determined thereby.

6. The combination as specified in claim 4, first and second mutually normal levels carried by said housing, and angularly related link connections, each adjustable in length, connecting said housing to said platform.

7. A panoramic sight comprising upper and lower tube sections, said upper section being mounted on and rotatable relatively to said lower section about their common longitudinal axes, an entrance reflector pivoted on a normally horizontal axis at the upper end of said upper section, first and second interfitting sleeves journaled within and coaxially of said lower tube section, said first sleeve being rigidly connected with said upper tube section, means on the lower end of said lower section to rotate said first sleeve and upper section, said means including a cup-shaped dial rigidly attached to the lower end of said first sleeve, a housing for said dial a 90° ocular rigidly carried by the housing below said dial, said housing being fixed to the lower end of said lower tube section and including a radial flange axially spaced above and parallel with said dial, means carried by said housing to axially translate said second sleeve, said last-named means including a threaded collar concentric of said longitudinal axis and rotatably fitting between said flange and dial, means responsive to axial translation of said second sleeve to pivot said entrance reflector, and optical elements within said upper tube section and second sleeve to focus rays from said entrance reflector axially through said tube sections and dial into said ocular.

8. In a panoramic telescope, a normally vertical lower tube section, an upper tube section pivoted on said lower tube section in axial end-to-end alignment therewith, an entrance prism pivoted on a normally horizontal axis at the top of said upper section, a flange having a plane lower surface fixedly carried by the lower end of said lower section, a housing secured to and depending from said flange, an ocular carried by the lower end of said housing, first and second concentric sleeves rotatably mounted within said lower tube section, a rigid connection between said first sleeve and upper tube section, a cup-shaped dial fixed to the lower end of said first sleeve within said housing, azimuth indicator means carried by said housing and cooperable with said dial, means carried by said housing for rotating said dial, first sleeve and upper tube section as a unit, an internally threaded collar journalled within said housing between said plane surface and dial coaxial of said tube sections, a ring threadedly engaging said collar and mounted for axial translation only, a connection between said ring and second sleeve, means responsive to axial translation of said second sleeve to pivot said prism about its horizontal axis, manually operable means carried by said housing to rotate said collar and thereby axially translate said ring and second sleeve to pivot said prism, and optical means within said tube sections to project rays from said prism axially along said tube sections to said ocular.

9. In a periscopic sight, a lower normally vertical tube, having a housing fixed to the lower end of said tube, a first sleeve fitting and rotatably mounted within said lower tube coaxially therewith and extending downwardly into said housing, an upper tube fixed to the upper end of said first sleeve in coaxial end-to-end relation therewith and projecting externally of said lower tube, an entrance prism pivoted in the upper end of said upper tube about a normally horizontal axis, an eyepiece carried by said housing, a second sleeve coaxially rotatable within said first sleeve and extending into said housing, optical means including a dove prism fixed in said second sleeve and a second prism fixed in said housing said dove prism and second prism projecting into said eyepiece rays incident on and reflected axially along said tubes by said entrance prism, a circular dial in said housing fixed to said first sleeve coaxially thereof, and a differential in said housing including a first sun gear fixed to said first sleeve, a second sun gear fixed to said housing, and a planetary gear journaled on said second sleeve and meshing with both said sun gears.

10. The sight recited in claim 9, a third sleeve having a square-cut upper end and journaled between and coaxially with said first and second sleeves, a push rod mounted for axial translation within and along said upper tube and having its lower end resting on the upper end of said third sleeve, means operated by axial translation of said push rod to pivot said entrance prism about its horizontal axis, and manually operable means carried by said lower tube and housing to axially translate said third sleeve and thereby pivot said entrance prism about its normally horizontal axis.

11. The sight recited in claim 10, said last-included means comprising a fourth sleeve mounted for axial translation only between said lower tube and first sleeve and extending into said housing, a pin fixed to the upper end of said fourth sleeve and engaging an aperture in said third sleeve through a slot in said first sleeve, a threaded collar journaled in said housing, a ring threaded into said collar and fixed to the lower end of said fourth sleeve, means carried by said housing and operable externally thereof to rotate said collar, and means carried by said housing and operable externally thereof to rotate said dial, first sleeve and upper tube as a unit relatively to said lower tube about their common longitudinal axis.

GEORGE RATTRAY.

REFERENCES CITED

The following references are of record in the file of this patent:

UNITED STATES PATENTS

| Number | Name | Date |
| --- | --- | --- |
| 873,228 | Hahn | Dec. 10, 1907 |
| 1,188,049 | Dawson et al. | June 20, 1916 |
| 1,188,844 | Schurmann | June 27, 1916 |
| 1,191,936 | Arms | July 25, 1916 |
| 1,430,193 | Schurmann | Sept. 26, 1922 |
| 2,152,726 | Baroni | Apr. 4, 1939 |
| 2,184,615 | Gunther | Dec. 26, 1939 |
| 2,362,773 | Robinson | Nov. 14, 1944 |

FOREIGN PATENTS

| Number | Country | Date |
| --- | --- | --- |
| 274,912 | Great Britain | Jan. 25, 1929 |